(12) United States Patent
Yu et al.

(10) Patent No.: US 11,817,974 B2
(45) Date of Patent: Nov. 14, 2023

(54) SOUNDING-INTERVAL ADAPTATION USING LINK QUALITY

(71) Applicant: MEDIATEK INC., Hsinchu (TW)

(72) Inventors: Hao-Chih Yu, Hsinchu (TW);
Pu-Hsuan Lin, Hsinchu (TW);
Yu-Ting Su, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/820,282

(22) Filed: Aug. 17, 2022

(65) Prior Publication Data

US 2022/0400033 A1 Dec. 15, 2022

Related U.S. Application Data

(63) Continuation of application No. 17/215,742, filed on Mar. 29, 2021, now Pat. No. 11,463,282.

(60) Provisional application No. 63/003,357, filed on Apr. 1, 2020.

(51) Int. Cl.
| | | |
|---|---|---|
| *H04L 25/02* | (2006.01) | |
| *H04L 5/00* | (2006.01) | |
| *H04L 1/1607* | (2023.01) | |
| *H04W 72/044* | (2023.01) | |
| *H04W 72/23* | (2023.01) | |
| *H04B 7/0452* | (2017.01) | |

(52) U.S. Cl.
CPC ........ *H04L 25/0228* (2013.01); *H04L 1/1607* (2013.01); *H04L 5/0048* (2013.01); *H04W 72/046* (2013.01); *H04W 72/23* (2023.01); *H04B 7/0452* (2013.01)

(58) Field of Classification Search
CPC . H04L 5/0048; H04L 25/0224; H04L 1/0003; H04L 1/0009; H04L 5/0023; H04L 25/0222; H04B 7/0617; H04B 7/0452; H04B 7/0417; H04B 7/0456; H04B 7/0413; H04B 7/0626; H04W 84/12; H04W 24/10; H04W 24/02; H04W 72/542; H04W 72/046; H04W 88/08; H04W 72/541
USPC ........................................................ 375/262
See application file for complete search history.

(56) References Cited

U.S. PATENT DOCUMENTS

| | | | |
|---|---|---|---|
| 2013/0039319 A1 | 2/2013 | Shi et al. | |
| 2014/0269961 A1* | 9/2014 | Gao ..................... | H04L 1/0027 375/267 |
| 2016/0036572 A1* | 2/2016 | Bhanage .............. | H04B 7/0617 370/329 |
| 2016/0127019 A1 | 5/2016 | Schelstraete et al. | |

(Continued)

*Primary Examiner* — Eva Y Puente
(74) *Attorney, Agent, or Firm* — McClure, Qualey & Rodack, LLP

(57) ABSTRACT

A method for sounding-interval adaptation using link quality for use in an apparatus is provided. The apparatus includes a sounding transceiver. The method includes the following steps: periodically transmitting a sounding packet to a beamformee through a downlink channel from the apparatus to the beamformee according to a first sounding interval; in response to the sounding transceiver receiving a data packet or a report packet from the beamformee, obtaining a current first channel profile from the received data packet or the received report packet; and adaptively adjusting the first sounding interval according to a first mobility indicator which is calculated according to the current first channel profile and the previous first channel profile.

20 Claims, 7 Drawing Sheets

(56) References Cited

U.S. PATENT DOCUMENTS

| | | | |
|---|---|---|---|
| 2016/0254884 A1* | 9/2016 | Hedayat | H04B 7/0628 370/329 |
| 2018/0123835 A1* | 5/2018 | Siraj | H04W 24/08 |
| 2018/0262249 A1 | 9/2018 | Tsang et al. | |
| 2019/0222270 A1 | 7/2019 | Schelstraete | |

* cited by examiner

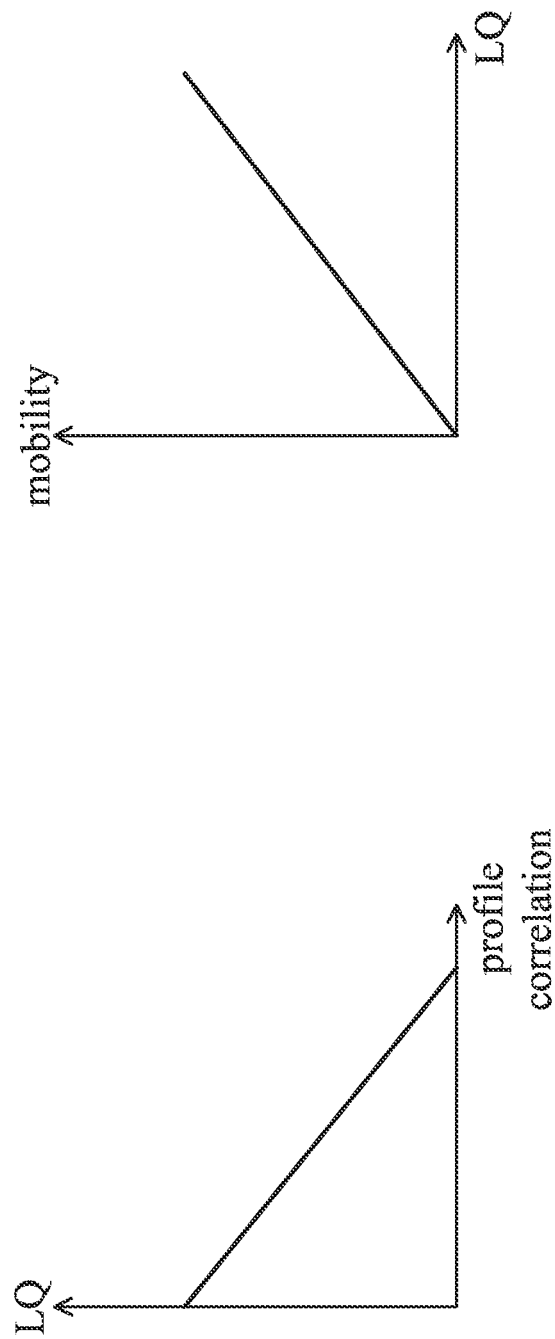

SOUNDING-INTERVAL ADAPTATION USING LINK QUALITY

CROSS REFERENCE TO RELATED APPLICATIONS

This application is a Continuation of application Ser. No. 17/215,742 filed Mar. 29, 2021, which claims the benefit of U.S. Provisional Application No. 63/003,357, filed on Apr. 1, 2020, the entirety of which are incorporated by reference herein.

BACKGROUND OF THE INVENTION

Field of the Invention

The present invention relates to multi-input multi-output (MIMO) and multi-input single output (MISO) systems, and, in particular, to an apparatus and a method for sounding-interval adaptation using link quality (LQ).

Description of the Related Art

Wireless communications systems that involve the use of transmitters and receivers having multiple antennas are known as multiple-input multiple-output (MIMO) systems. They offer increased peak data rates, spectral efficiency, and quality of service through the use of a plurality of parallel data streams.

Relative to other wireless technologies, MIMO may enable substantial gains in both system capacity and transmission reliability without requiring an increase in frequency spectrum resources.

Due to the complexity associated with providing multiple transmitted streams having adjusted phase and amplitude, MIMO systems rely on having accurate current channel state information (CSI) or Beamforming feedback information. In a beamforming system, the channel may be estimated using a sounding protocol. By sending a known pattern of information, the characteristics of the signal appearing at the receiver may be used to determine the CSI or Beamforming feedback information, which is then fed back to the transmitter (e.g., an access point or a beamformer). However, due to the motion of the receiver (e.g., a station or a beamformee) or surrounded objects in the environment, the CSI or Beamforming feedback information of the channel may vary rapidly, and the Doppler Effect will affect the performance of beamforming. Therefore, it would be desirable to be able to adaptively adjust a sounding interval that can facilitate Doppler compensation, thereby improving the performance of beamforming.

BRIEF SUMMARY OF THE INVENTION

An embodiment of the present invention provides an apparatus. The apparatus includes a mobility processor, a sounding transceiver, a sounding-control circuit, and a mobility-calculating circuit. The sounding transceiver is configured to periodically transmit a sounding packet to a beamformee through a downlink channel from the apparatus to the beamformee according to a first sounding interval. The sounding-control circuit is configured to control the first sounding interval in response to a control signal from the mobility processor. In response to the sounding transceiver successfully receiving a data packet or a report packet from the beamformee, the mobility-calculating circuit obtains a current first channel profile from the received data packet or the received report packet. The mobility processor adaptively adjusts the first sounding interval according to a first mobility indicator which is calculated according to the current first channel profile and a previous first channel profile.

Another embodiment of the present invention provides a method for sounding-interval adaptation using link quality for use in an apparatus. The apparatus includes a sounding transceiver. The method includes the following steps: periodically transmitting a sounding packet to a beamformee through a downlink channel from the apparatus to the beamformee according to a first sounding interval; in response to the sounding transceiver receiving a data packet or a report packet from the beamformee, obtaining a current first channel profile from the received data packet or the received report packet; and adaptively adjusting the first sounding interval according to a first mobility indicator which is calculated according to the current first channel profile and the previous first channel profile.

Yet another embodiment of the present invention provides an apparatus. The apparatus includes a mobility processor, a sounding transceiver, a sounding-control circuit, and a mobility-calculating circuit. The sounding transceiver is configured to periodically transmit a sounding packet to a beamformee through a downlink channel from the apparatus to the beamformee using a first sounding interval. The sounding-control circuit is configured to control the first sounding interval in response to a control signal from the mobility processor. In response to the sounding transceiver receiving a data packet or a report packet from the beamformee, the mobility-calculating circuit calculates a first mobility indicator of the beamformee according to a current first channel profile from the received data packet or the received report packet. The mobility processor obtains a second sounding interval according to the first mobility indicator and adaptively adjusts the first sounding interval according to the second sounding interval in response to a comparison result of the current first channel profile and a previous first channel profile.

BRIEF DESCRIPTION OF THE DRAWINGS

The present invention can be more fully understood by reading the subsequent detailed description and examples with references made to the accompanying drawings, wherein:

FIG. 3A is a diagram showing relationships between LQ and profile correlation in accordance with an embodiment of the invention;

FIG. 3B is a diagram showing relationships between mobility and LQ in accordance with an embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1:
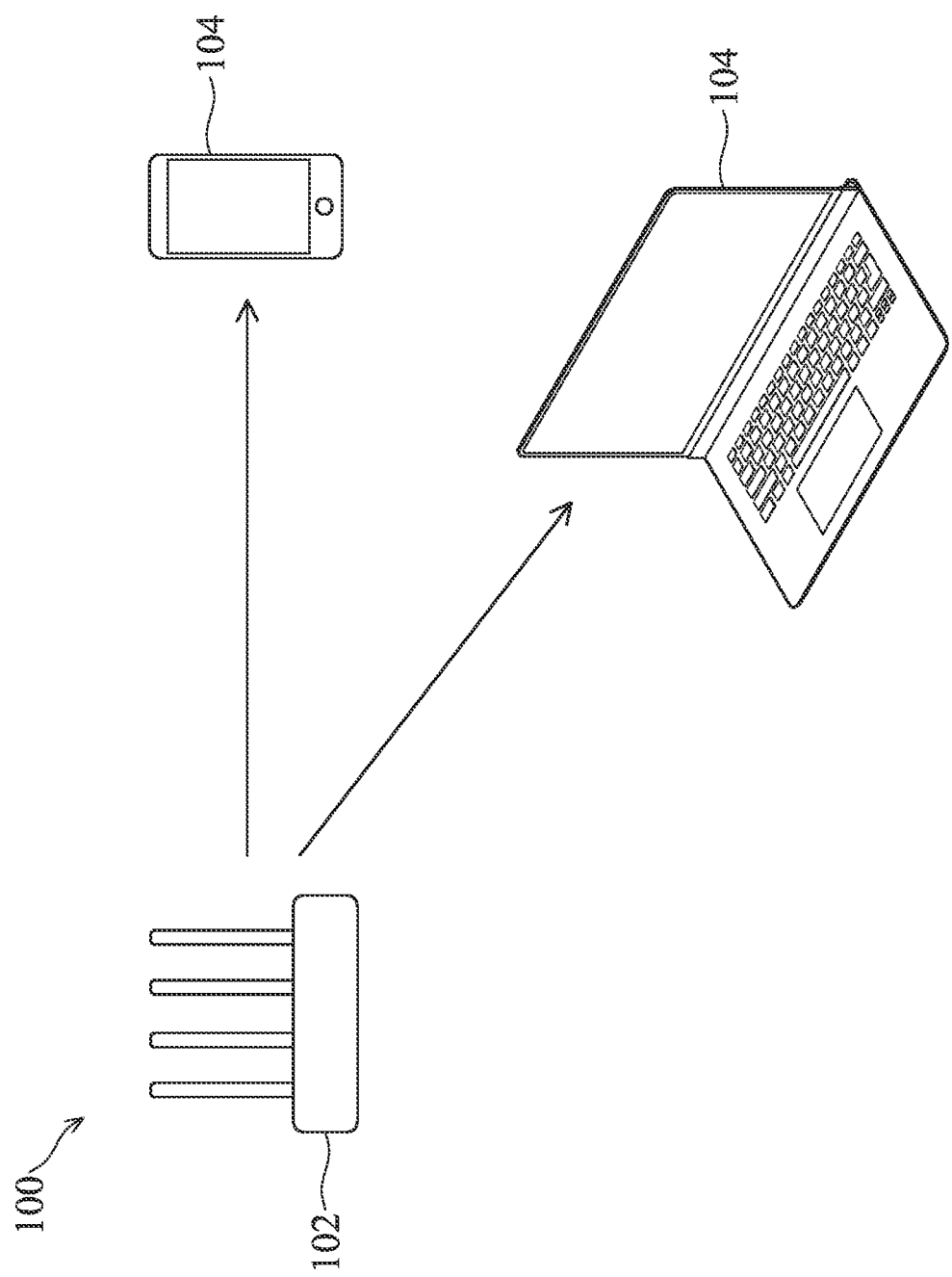
FIG. 1 is a diagram of a wireless local area network (WLAN) in accordance with an embodiment of the invention.

FIG. 1 is a diagram of a wireless local area network (WLAN) in accordance with an embodiment of the invention.

The WLAN 100 may include beamformer 102 and one or more beamformees 104, wherein the beamformees 104 may be all or part of the beamformees that are located within the range of the beamformer 102. In an embodiment, the beamformer 102 may be a central wireless router, and the beamformees 104 may include laptops, desktop computers, smartphones, tablet PCs, etc. Although FIG. 1 shows one beamformer 102 and two beamformees 104, one of ordinary skill in the art will readily recognize that there could be any number of beamformers and any number of beamformees, and such numbers would be within the spirit and scope of the invention.

In some embodiments, the beamformer 102 maintains the WLAN 100 by associating and authenticating new WLAN devices such as beamformees 104, and by coordinating transmissions based on time and bandwidth requests by the beamformees 104. In one embodiment, the beamformees 104 enhance network efficiency by enabling data transmission by the beamformer 102 to multiple beamformees 104 simultaneously using advanced SU beamforming and multi-user (MU) MIMO techniques.

Figure 2A:
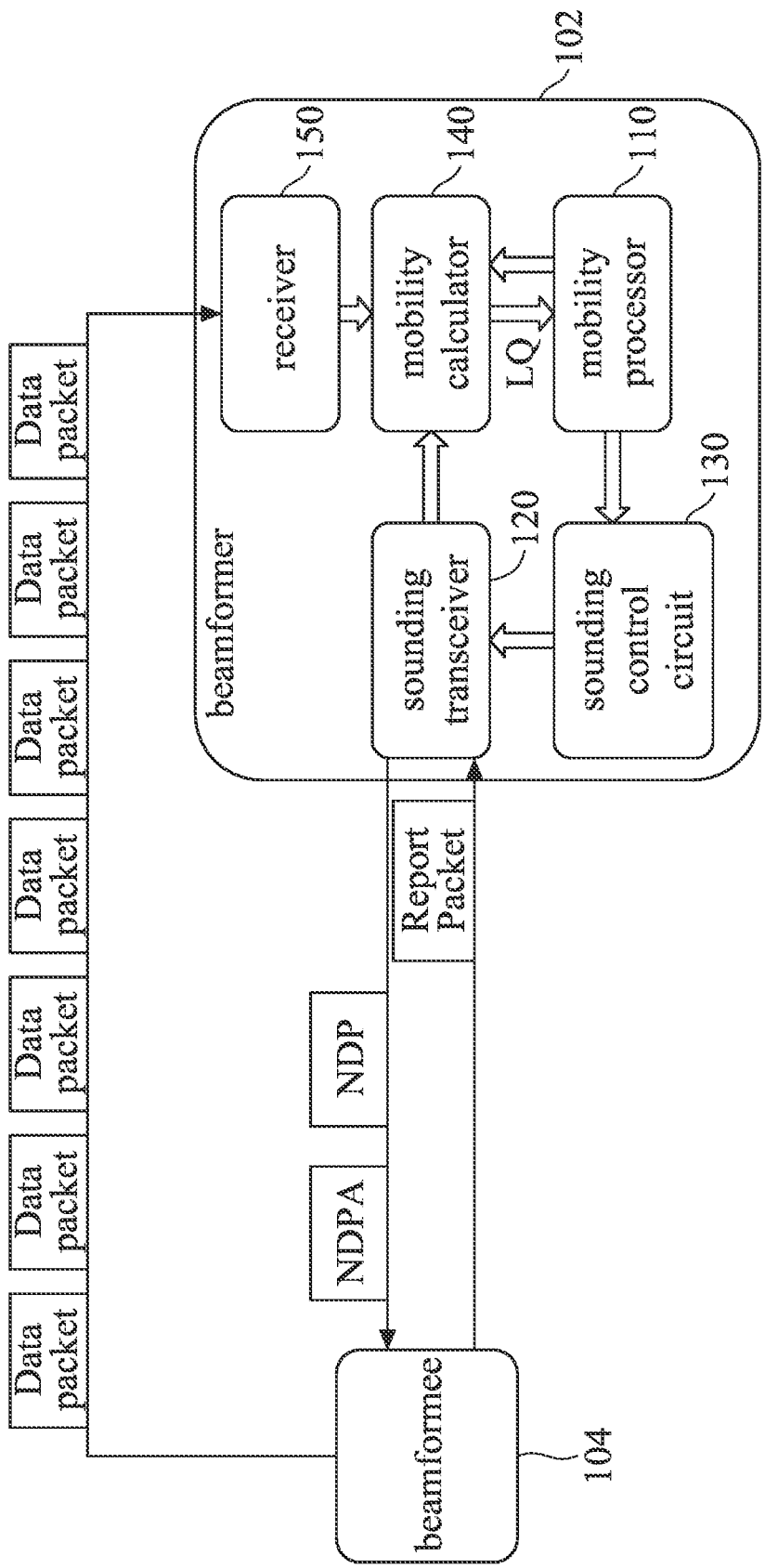
FIG. 2A is a block diagram of the beamformer 102 in accordance with the embodiment of FIG. 1.

FIG. 2A is a block diagram of the beamformer 102 in accordance with the embodiment of FIG. 1. Please refer to both FIG. 1 and FIG. 2A.

For convenience of description, one beamformee 104 is illustrated in FIG. 2A. The beamformer 102 may include a mobility processor 110, a sounding transceiver 120, a sounding-control circuit 130, a mobility-calculating circuit 140, and a receiver 150. The mobility processor 110 may be a central processing unit (CPU), a general-purpose processor, a digital signal processor (DSP), or a microcontroller, but the disclosure is not limited thereto.

The sounding transceiver 120 may include a plurality of antennas (not shown) capable of transmitting wireless signals to the beamformees 104 and receiving wireless signals from the beamformees 104. The sounding-control circuit 130 may control the sounding interval that is used by the sounding transceiver 120 to periodically sound the channels. The mobility-calculating circuit 140 may be configured to calculate link quality (LQ) according to the received CSI at different times, where the calculated LQ can be regarded as a mobility indicator of the beamformee 104. The receiver 150 may include one or more antennas capable of receiving the uplink data packets from the beamformee 104, and the receiver 150 may estimate the channel state information of the uplink channel from beamformee 104 to the beamformer 102. In some embodiments, the receiver 150 may be referred to as an implicit beamformee.

In an embodiment, it is assumed that the connection between the beamformer 102 and one of the beamformees 104 has been established, as depicted in FIG. 2A, and the beamformer 102 may periodically sound the channels (i.e., transmitting a sounding packet) using a sounding interval M. The sounding operation can be performed in the form of a NDPA (null data packet announcement) and NDP (null data packet). For example, if the beamformee 104 supports beamforming or MU MIMO, the sounding operation can be performed by the beamformer 102 with triggering sounding. If the AP 102 does not receive a report packet at time t+Δt, the sounding operation can be performed by the AP 102 without receiving sounding report packet.

The beamformer 102 may request the downlink (DL) channel state information (CSI) from the beamformee 104 by transmitting a sounding packet to the beamformee 104. In response to receiving a sounding packet from the beamformer 102 at time t, the beamformee 104 may send back a report packet, which includes the CSI at time t, to the beamformer 102. Similarly, the beamformer 102 may sound the channel between the beamformer 102 and the beamformee 104 at time t+M. In response to the sounding from the beamformer 102 at time t+M, the beamformee 104 may send back another report packet, which includes the CSI at time t+M, to the beamformer 102, and so on.

Specifically, the CSI in the report packet at time t may include channel parameters such as $\phi_i(t)$, $\psi_i(t)$, $SNR_{avg}(t)$, $\Delta SNR_i(t+\Delta t)$ which are defined in the 802.11 specification and well-known to those skilled in the art. Similarly, the CSI in the report packet at time t+Δt may include channel parameters such as $\phi_i(t+\Delta t)$, $\psi_i(t+\Delta t)$, $SNR_{avg}(t+\Delta t)$, $\Delta SNR_i(t+\Delta t)$. It should be noted that the aforementioned CSI at times t and t+Δt is dedicated for the channel between the beamformee 104 (i.e., single user) and the beamformer 102. In some embodiments, the CSI obtained by the beamformer 102 from each beamformee 104 can be referred to as a "channel profile" of a single user.

In an embodiment, the mobility-calculating circuit 140 is capable of calculating a signal-to-interference-plus-noise ratio (SINR) of the channel between the beamformee 104 and the beamformer 102 using the CSI reported from the beamformee 104. For example, the SINR of the channel can be expressed by equation (1):

$$SINR = \frac{S}{I+N} \quad (1)$$

where S denotes the power of the incoming signal of interest (e.g., the sounding packet); I denotes the profile correlation between the current channel profile and the previous channel profile; N denotes some noise term.

In addition, the LQ can be expressed by a function of SINR, such as $$LQ = f\left(\frac{S}{I+N}\right).$$

Given that the parameters S and N are known from the CSI, the higher the profile correlation is, the smaller the LQ is. The lower the profile correlation is, the larger the LQ is, as depicted in FIG. 3A.

In addition, if the LQ value is smaller, it may indicate that the channel state remains the same, and the corresponding beamformee 104 has lower mobility. If the LQ value is greater, it may indicate that the channel state varies significantly, and the corresponding beamformee 104 has higher mobility, as depicted in FIG. 3B.

Figure 2B:
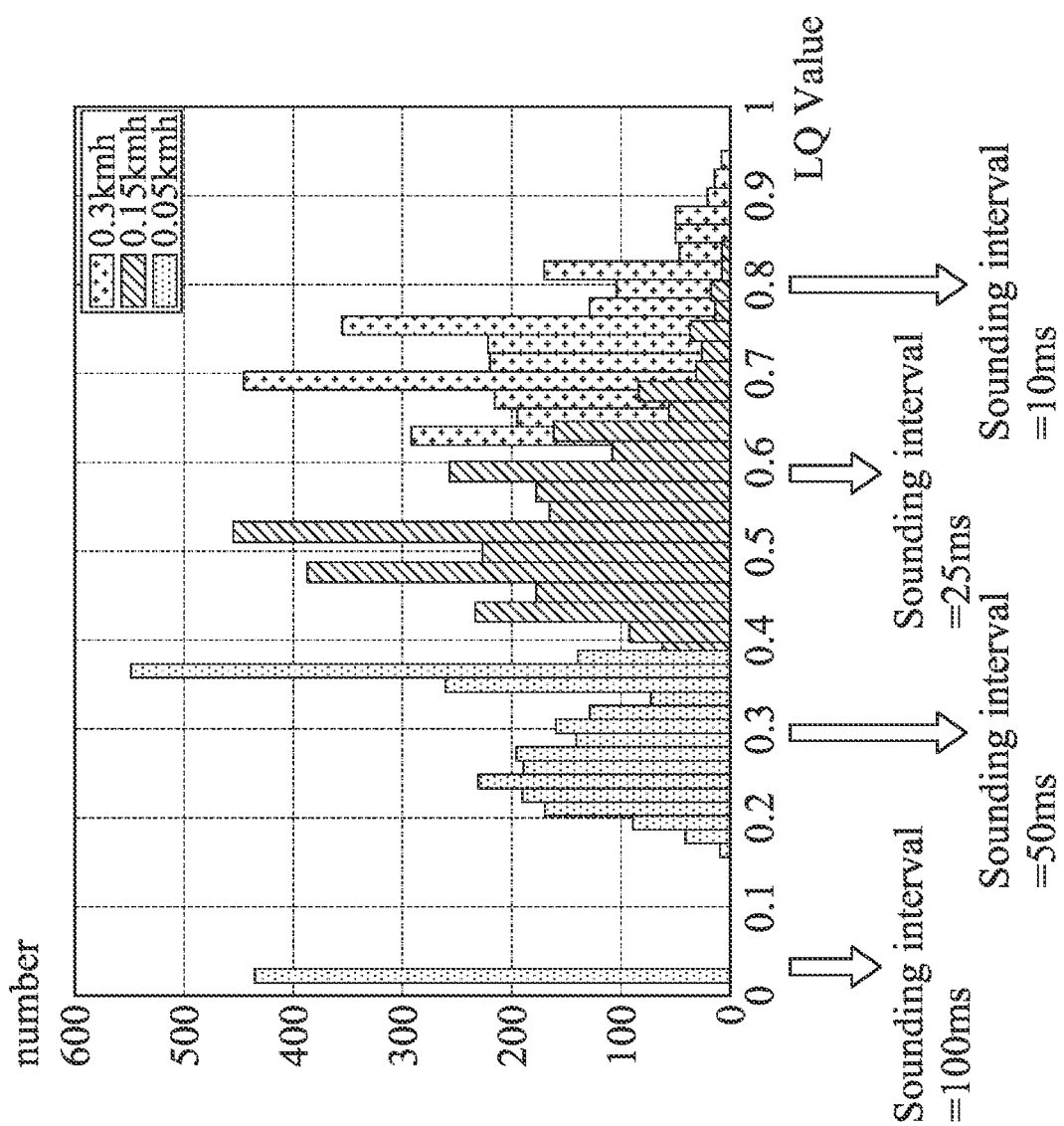
FIG. 2B is a histogram of LQ values and the moving speed of the beamformee in accordance with an embodiment of the invention.

FIG. 2B is a histogram of LQ values and the moving speed of the beamformee in accordance with an embodiment of the invention.

Since the relationship between the LQ value and mobility is known from FIG. 3B, a histogram showing the relationships between the LQ value, moving speed of the beamformee, and the corresponding sounding interval can be obtained by performing a plurality of tests, as depicted in FIG. 2B. For example, when the moving speed (i.e., Doppler speed) of the beamformee 104 is at 0.05 km/h, the LQ value is approximately close to 0 given the sounding interval being 100 ms, and the LQ value is approximately within the range between 0.1 and 0.4 given the sounding interval being 50 ms. When the moving speed of the beamformee 104 is at 0.15 km/h, the LQ value is approximately within the range between 0.4 and 0.6 given the sounding interval being 25 ms. When the moving speed of the beamformee is at 0.3 km/h, the LQ value is approximately within the range between 0.6 and 1 given the sounding interval being 10 ms. Please note that the moving speed of the beamformee can also be seen as the relative moving speed of some objects in the environment, and the scenarios are similar or equivalent to the descriptions above accordingly.

Accordingly, based on the relationships between the LQ value, sounding interval of the beamformer 102, and the moving speed of beamformee 104 shown in FIG. 2B, the LQ value can be used as a mobility indicator so as to adaptively adjust the sounding interval used by the beamformer 102. Details for obtaining the LQ value can be referred to in the following embodiments of FIGS. 2C and 2D.

Figure 2C:
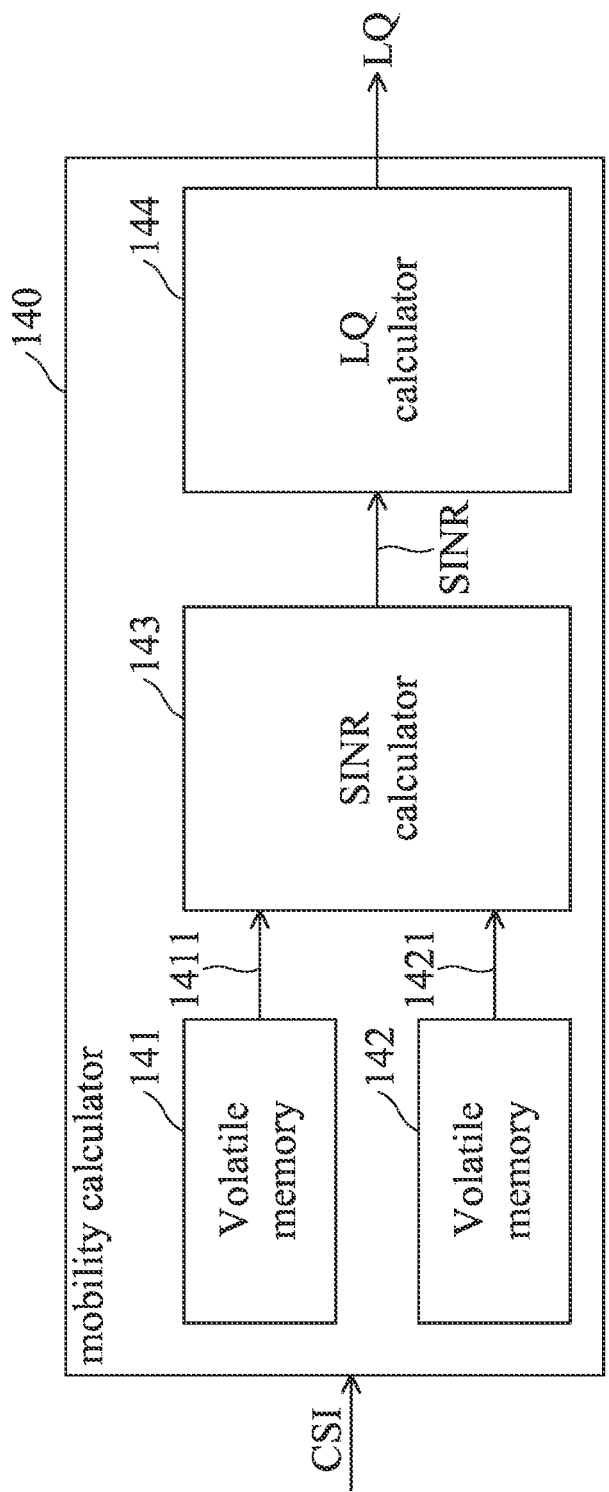
FIG. 2C is a block diagram of the mobility-calculating circuit 140 in accordance with the embodiment of FIG. 2A.
Figure 2D:
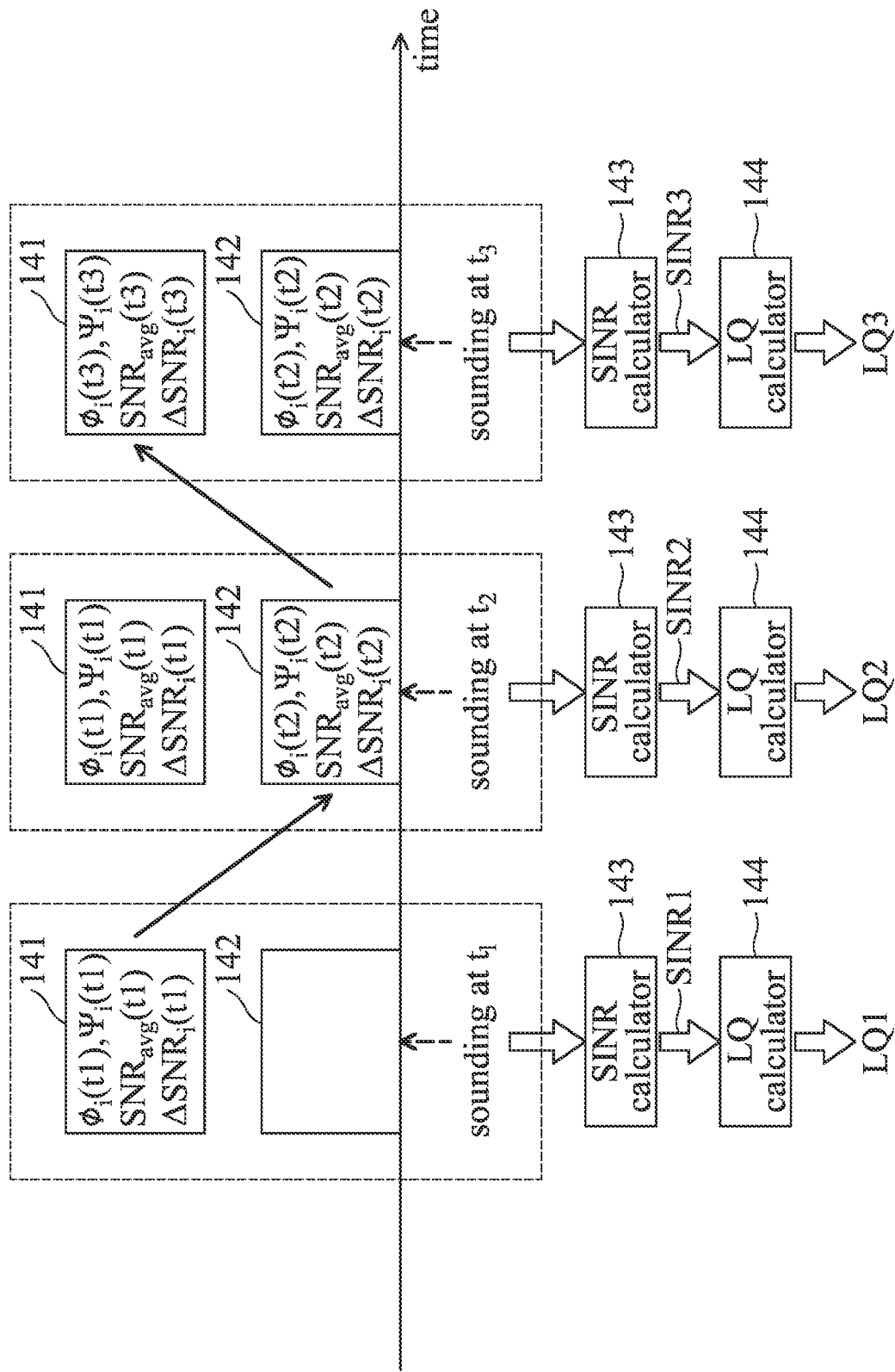
FIG. 2D is a diagram of ping-pong scheme used in the mobility-calculating circuit in accordance with the embodiment of FIG. 2C.

FIG. 2C is a block diagram of the mobility-calculating circuit 140 in accordance with the embodiment of FIG. 2A. FIG. 2D is a diagram of ping-pong scheme used in the mobility-calculating circuit 140 in accordance with the embodiment of FIG. 2C. Please refer to FIG. 2A and FIGS. 2C-2D.

In an embodiment, the mobility-calculating circuit 140 may include volatile memories 141 and 142, an SINR calculator 143, and an LQ calculator 144. The volatile memories 141 and 142 may be implemented by static random access memories (SRAMs) or register files, but the invention is not limited thereto. The volatile memories 141 and 142 may be configured to respectively store the CSI (i.e., channel profile) reported from the beamformee 104 at different times (e.g., two consecutive sounding times), such as times t1 and t2, times t3 and t2, and so on. The SINR calculator 143 may be configured to calculate the SINR of the downlink channel from the beamformer 102 to the beamformee 104 according to the CSI at different times stored in the volatile memories 141 and 142.

It is assumed that the volatile memories 141 and 142 are empty before the beamformer 102 performs the sounding operation. As described in the aforementioned embodiment, the CSI (i.e., channel profile) in the report packet at time t1 may include channel parameters such as $\phi_i(t1)$, $\psi_i(t1)$, $SNR_{avg}(t1)$, $\Delta SNR_i(t1)$. These channel parameters of the downlink channel at time t1 are stored in the volatile memory 141, as shown in FIG. 2D. Similarly, the CSI in the report packet at time t2 later than time t1 may include channel parameters such as $\phi_i(t2)$, $\psi_i(t2)$, $SNR_{avg}(t2)$, $\Delta SNR_i(t2)$. These channel parameters of the downlink channel at time t2 are stored in the volatile memory 142 since the volatile memory 142 is empty at this time. The CSI in the report packet at time t3 later than time t2 may include channel parameters such as $\phi_i(t3)$, $\psi_i(t3)$, $SNR_{avg}(t3)$, $\Delta SNR_i(t3)$. The content stored in the volatile memory 141 are overwritten by these channel parameters of the downlink channel at time t3 since the volatile memory 141 previously stores most outdated channel profile at time t1.

Specifically, the memory overwriting operation described above may follow a ping-pong scheme, where the volatile memory (i.e., either the volatile memory 141 or 142) storing the most outdated channel profile will be overwritten by the incoming channel profile in an alternate fashion. Thus, the SINR calculator 143 may calculate the SINR of the downlink channel according to the channel profiles stored in the volatile memory 141 and 142, and the LQ calculator 144 may map the calculated SINR to an LQ using a prebuilt mapping table stored in a non-volatile memory, and the prebuilt mapping table records the mapping relationships of the SINR and LQ. The LQ calculator 144 may send the LQ to the mobility processor 110.

For example, singular value decomposition (SVD) may be applied on the estimated channel matrix $H_i(t)$ in size of $N_r \times N_t$, where $N_r$ denotes the number of receiving antennas of the beamformee 104, and $N_t$ denotes the number of transmitting antennas of the sounding transceiver 120. Thus, the estimated channel matrix $H_i(t)$ can be expressed by equation (2):

$$H_i(t)=\Sigma_i(t)V_i(t)^H \qquad (2)$$

where $V_i(t)^H$ denotes the right singular matrix that can be derived from the channel parameters $\phi_i(t)$ and $\psi_i(t)$; and $\Sigma_i(t)$ denotes the summation of singular values. Similarly, the estimated channel matrix $H_i(t+\Delta t)$ can be expressed by equation (3):

$$H_i(t+\Delta t)=\Sigma_i(t+\Delta t)V_i(t+\Delta t)^H \qquad (3)$$

If time t represents time t1, time t+Δt may represent time t2. If time t represents time t2, time t+Δt may represent time t3. Accordingly, the SINR calculator 143 may calculate the SINR1 using the estimated channel matrices $H_i(t1)$ at time t1 (i.e., the channel profile 1411 stored in the volatile memory 141), and the LQ calculator 144 may map the SINR1 to LQ1 using the prebuilt mapping table.

Similarly, at time t2, the SINR calculator 143 may calculate the SINR2 using the estimated channel matrices $H_i(t1)$ at time t1 (i.e., the channel profile 1411 stored in the volatile memory 141) and the estimated channel matrices $H_i(t2)$ at time t2 (i.e., the channel profile 1421 stored in the volatile memory 142), and the LQ calculator 144 may map the SINR2 to LQ2 using the prebuilt mapping table. At time t3, the SINR calculator 143 may calculate the SINR3 using the estimated channel matrices $H_i(t2)$ at time t2 (i.e., the channel profile 1421 stored in the volatile memory 142) and the estimated channel matrices $H_i(t3)$ at time t3 (i.e., the channel profile 1411 stored in the volatile memory 141), and the LQ calculator 144 may map the SINR3 to LQ3 using the prebuilt mapping table.

The mobility processor 110 may obtain the LQ value generated by the mobility-calculating circuit 140, and determine whether to adjust the current sounding interval according to the obtained LQ value. For example, the mobility processor 110 may search an LQ-mapping table that records the relationships between the LQ value and sounding interval, using the obtained LQ value to obtain the most appropriate sounding interval at the current time. If the obtained sounding interval is much shorter than the current sounding interval (e.g., shorter by a predetermined ratio, such as half (50%), but not limited), the mobility processor 110 may control the sounding transceiver 120 to perform the sounding operation immediately because the estimated mobility of the beamformee 104 at the current time may become much higher than the previously estimated mobility. If the obtained sounding interval is not much shorter than the current sounding interval (e.g., shorter by a predetermined ratio, such as half (50%), but not limited), the mobility processor 110 may inform the sounding-control circuit 130 to update the current sounding interval with the obtained sounding interval.

Attention now is directed to FIG. 2A again. The receiver 150 may include one or more antennas capable of receiving the uplink data packets from the beamformee 104, and the receiver 150 may estimate the channel state information (e.g., channel profile) of the uplink channel from beamformee 104 to the beamformer 102. Assuming that the channel states of the uplink channel and the downlink channel are reciprocal, the estimated CSI of the uplink channel can be used as the estimated CSI of the downlink channel in some situations.

For example, if the beamformee 104 does not respond a report packet to the beamformer 102 after the beamformer 102 performs the sounding operation, the sounding transceiver 120 cannot obtain the CSI about the downlink channel. In this time, the estimated CSI of the uplink channel will be used by the mobility-calculating circuit 140 to generate the LQ. In addition, if the beamformer 102 does not receive a report packet at time t+Δt, it indicates that the sounding operation is performed by the beamformer 102 without receiving a report packet. In this case, the estimated CSI of the uplink channel estimated at time t and time t+Δt will also be used by the mobility-calculating circuit 140 to generate the LQ. The estimated CSI of the uplink channel at the current time is written to either the volatile memory 141 or the volatile memory 142 in the aforementioned ping-pong scheme, wherein the volatile memory storing the most outdated channel profile will be overwritten with the estimated CSI of the uplink channel at the current time (i.e., the current second channel profile).

It should be noted that estimating the CSI of the uplink channel by the receiver 150 and estimating the CSI of the downlink channel by the beamformee 104 can be performed simultaneously in parallel. In the condition that the sounding transceiver 120 and the receiver 150 respectively obtain the estimated CSI of the downlink channel and the uplink channel, the estimated CSI of the downlink channel has a higher priority than that of the uplink channel to be used by the mobility-calculating circuit 140. In case of the estimated CSI of the downlink channel being absent, the estimated CSI of the uplink channel will be used by the mobility-calculating circuit 140.

Figure 4:
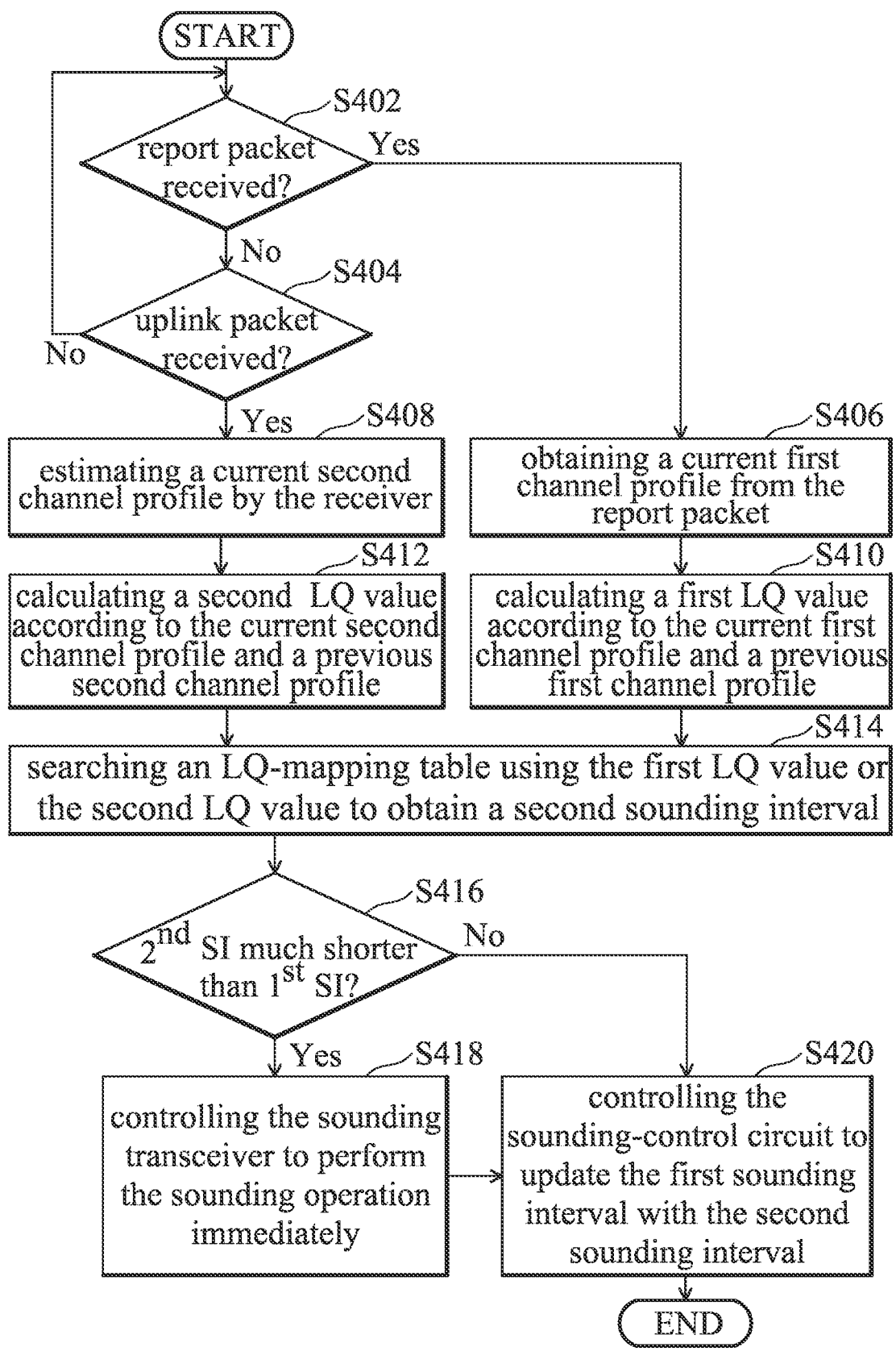
FIG. 4 is a flow chart of a method for sounding-interval adaptation using LQ in accordance with an embodiment of the invention.

FIG. 4 is a flow chart of a method for sounding-interval adaptation using LQ in accordance with an embodiment of the invention. Please refer to FIG. 2A and FIG. 4.

In step S402, the mobility processor 110 determines whether a report packet is received by the beamformer 102 from the beamformee 104 (e.g., within a predetermined period of time) after the beamformer 102 has performed a sounding operation. If it is determined that a report packet is received, step S408 is performed. If it is determined that a report packet is not received, step S404 is performed. For example, the sounding-control circuit 130 may use a first sounding interval to perform the sounding operation.

In step S404, the mobility processor 110 determines whether an uplink packet is received by the beamformer 102 from the beamformee 104. If it is determined that an uplink packet is received, step S408 is performed. If it is determined that an uplink packet is not received, start to perform step S402 again.

In step S406, a current first channel profile is obtained from the received report packet. For example, the report packet from the beamformee 104 may include channel parameters of the downlink channel at the time (e.g., time t as current time) when the sounding packet is emitted by the sounding transceiver 120. The channel parameters may include $\phi_i(t)$, $\psi_i(t)$, $SNR_{avg}(t)$, $\Delta SNR_i(t)$, which can be collectively regarded as the channel profile.

In step S408, the receiver (i.e., implicit beamformee) 150 estimates a current second channel profile of the uplink channel. Assuming that the channel states of the uplink channel and the downlink channel are reciprocal, the estimated CSI of the uplink channel can be used as the estimated CSI of the downlink channel in some situations, such as the beamformee 104 not responding a report packet to the beamformer 102. It should be noted that if the determination of step S402 resolves "Yes", step S404 can also be performed to determine whether an uplink packet is received by the beamformer 102 from the beamformee 104. If the determination of step S404 also resolves "Yes", the receiver 150 will estimate the second profile of the uplink channel. In other words, steps S406 and S408 can be performed in parallel.

In step S410, the mobility-calculating circuit 140 calculates a first LQ value according to the current first channel profile and a previous first channel profile. For example, the current first channel profile (e.g., at time t) and the previous first channel file (e.g., at time t−Δt) will be stored in the volatile memories 141 and 142 in a ping-pong scheme, as described in the embodiment of FIGS. 2C-2D.

In step S412, the mobility-calculating circuit 140 calculates a second LQ value according to the current second channel profile and a previous second channel profile. For example, the current second channel profile and the previous second channel profile will be stored in the volatile memories 141 and 142 in a ping-pong scheme, as described in the embodiment of FIGS. 2C-2D. In addition, the first channel profile of the downlink channel has a higher priority than the second channel profile of the uplink channel. For example, the mobility-calculating circuit 140 will use the current first channel profile and the previous first channel profile to calculate the first LQ value in response to the sounding transceiver 120 successfully receiving the report packet from the beamformee 104 at time t+Δt (i.e., within a predetermined time period after the sounding packet is transmitted). The mobility-calculating circuit 140 will use the current second channel profiles and the previous second channel profile to calculate the second LQ value in response to the sounding transceiver 120 failing to receive the report packet from the beamformee 104 at time t+Δt (i.e., within a predetermined time period after the sounding packet is transmitted).

In step S414, the mobility processor 110 searches an LQ-mapping table using the first LQ value or the second LQ value to obtain a second sounding interval. For example, the LQ-mapping table records the relationships between the LQ value and sounding interval, as described in the embodiment in FIG. 2B. If the LQ value becomes higher, it indicates that the corresponding mobility of the beamformee 104 may become higher. Thus, the beamformer 102 may shorten the sounding interval to match the moving speed (i.e., Doppler speed) of the beamformee 104. Conversely, if the LQ value becomes lower, it indicates that the corresponding mobility of the beamformee may become lower. Thus, the beamformer 102 may increase or keep the sounding interval to match the moving speed of the beamformee 104.

In step S416, the mobility processor 110 determines whether the second sounding interval is much shorter than the first sounding interval. If it is determined that the second sounding interval is much shorter than the first sounding interval (e.g., shorter by a predetermined ratio, such as half (50%), but not limited), step S418 is performed. If it is determined that the second sounding interval is not much shorter than the first sounding interval, step S420 is performed.

In step S418, the mobility processor 110 controls the sounding transceiver 120 to perform the sounding operation immediately. For example, since the second sounding interval is much shorter than the first sounding interval, it may indicate that the estimated mobility of the beamformee 104 at the current time may become much higher than the previously estimated mobility. Thus, the mobility processor 110 may control the sounding transceiver 120 to perform the sounding operation immediately to renew the channel state information.

In step S420, the mobility processor 110 controls the sounding-control circuit 130 (e.g., via a control signal) to update the first sounding interval with the second sounding interval. For example, the sounding transceiver 120 may wait till the end of the current sounding interval (i.e., the first sounding interval), and perform the sounding operation at the next sounding interval using the updated sounding interval (i.e., the second sounding interval).

In view of the above, an apparatus and a method for sounding-interval adaptation using link quality have been disclosed. The apparatus and the method are capable of quickly determining the mobility of the beamformee using the LQ value by either the report packet from the beamformee or the uplink data packet from the beamformee so as to adaptively adjusting the sounding interval to match the moving speed of the beamformee, thereby facilitating Doppler compensation.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus, comprising:
a mobility processor;
a sounding transceiver, configured to periodically transmit a sounding packet to a beamformee through a downlink channel from the apparatus to the beamformee according to a first sounding interval;
a sounding-control circuit, configured to control the first sounding interval in response to a control signal from the mobility processor; and
a mobility-calculating circuit;
wherein in response to the sounding transceiver receiving a data packet or a report packet from the beamformee, the mobility-calculating circuit obtains a current first channel profile from the received data packet or the received report packet,
wherein the mobility processor adaptively adjusts the first sounding interval according to a first mobility indicator which is calculated according to the current first channel profile and a previous first channel profile.

2. The apparatus as claimed in claim 1, further comprising:
a receiver, configured to receive an uplink packet through an uplink channel from the beamformee to the apparatus, and estimate a current second channel profile of the uplink channel.

3. The apparatus as claimed in claim 2, wherein in response to the sounding transceiver failing to receive the report packet from the beamformee to respond to the sounding packet within a predetermined time period after the sounding packet is transmitted, the mobility-calculating circuit obtains the current second channel profile from the receiver, calculates a second mobility indicator of the beamformee according to the current second channel profile and a previous second channel profile,
wherein the mobility processor adaptively adjusts the first sounding interval according to the second mobility indicator.

4. The apparatus as claimed in claim 3, wherein the first mobility indicator and the second mobility indicator refer to a first LQ (link quality) value and a second LQ value of the beamformee, respectively.

5. The apparatus as claimed in claim 4, wherein in response to the sounding transceiver receiving a report packet from the beamformee to respond to the sounding packet, the mobility processor searches an LQ-mapping table using the first LQ value to obtain a second sounding interval, and adaptively adjusts the first sounding interval according to the second sounding interval in response to a comparison result of the current first channel profile and the previous first channel profile,
wherein in response to the sounding transceiver failing to receive the report packet from the beamformee to respond to the sounding packet within a predetermined time period after the sounding packet is transmitted, the mobility processor searches the LQ-mapping table using the second LQ value to obtain the second sounding interval, and adaptively adjusts the first sounding interval according to the second sounding interval in response to another comparison result of the current second channel profile and the previous second channel profile.

6. The apparatus as claimed in claim 4, wherein the mobility-calculating circuit comprises:
   a first volatile memory and a second volatile memory;
   an SINR (signal-to-interference-plus-noise ratio) calculator, configured to calculate an SINR of the downlink channel according to the channel profiles stored in the first volatile memory and the second volatile memory; and
   an LQ calculator, configured to map the calculated SINR to the first LQ value or the second LQ value according to a prebuilt mapping table,
   wherein the first volatile memory and the second volatile memory store the current first channel profile and the previous first channel profile in response to the sounding transceiver receiving the report packet from the beamformee to respond to the sounding packet,
   wherein the first volatile memory and the second volatile memory store the current second channel profile and the previous second channel profile in response to the sounding transceiver failing to receive the report packet from the beamformee to respond to the sounding packet within a predetermined time period after the sounding packet is transmitted.

7. The apparatus as claimed in claim 4, wherein the first volatile memory or the second volatile memory that stores the most outdated first channel profile or second channel profile are overwritten with the current first channel profile or the current second channel profile.

8. The apparatus as claimed in claim 4, wherein:
   the mobility processor compares the first sounding interval with the second sounding interval,
   in response to the second sounding interval being shorter than the first sounding interval by a predetermined ratio, the mobility processor controls the sounding transceiver to transmit another sounding packet to the beamformee immediately;
   in response to the second sounding interval not being shorter than the first sounding interval by the predetermined ratio, the mobility processor controls the sounding-control circuit to update the first sounding interval with the second sounding interval.

9. The apparatus as claimed in claim 4, wherein a moving speed of the beamformee is approximately proportional to the first LQ value or the second LQ value.

10. A method for sounding-interval adaptation using link quality, for use in an apparatus, wherein the apparatus comprises a sounding transceiver, the method comprising:
   periodically transmitting a sounding packet to a beamformee through a downlink channel from the apparatus to the beamformee according to a first sounding interval;
   in response to the sounding transceiver receiving a data packet or a report packet from the beamformee, obtaining a current first channel profile from the received data packet or the received report packet; and
   adaptively adjusting the first sounding interval according to a first mobility indicator which is calculated according to the current first channel profile and a previous first channel profile.

11. The method as claimed in claim 10, wherein the apparatus further comprises a receiver, and the method further comprises:
   using the receiver to receive an uplink packet through an uplink channel from the beamformee to the apparatus, and to estimate a current second channel profile of the uplink channel.

12. The method as claimed in claim 11, further comprising:
   in response to the sounding transceiver failing to receive the report packet from the beamformee to respond to the sounding packet within a predetermined time period after the sounding packet is transmitted, obtaining the current second channel profile from the receiver, calculating a second mobility indicator of the beamformee according to the current second channel profile and a previous second channel profile; and
   adaptively adjusting the first sounding interval using the second sounding interval according to the second mobility indicator.

13. The method as claimed in claim 12, wherein the first mobility indicator and the second mobility indicator refer to a first LQ (link quality) value and a second LQ value of the beamformee, respectively.

14. The method as claimed in claim 13, further comprising:
   in response to the sounding transceiver receiving a report packet from the beamformee to respond to the sounding packet, searching an LQ-mapping table using the first LQ value to obtain a second sounding interval, and adaptively adjusting the first sounding interval according to the second sounding interval in response to a comparison result of the current first channel profile and the previous first channel profile; and
   in response to the sounding transceiver failing to receive the report packet from the beamformee to respond to the sounding packet within a predetermined time period after the sounding packet is transmitted, searching the LQ-mapping table using the second LQ value to obtain the second sounding interval, and adaptively adjusting the first sounding interval according to the second sounding interval in response to another comparison result of the current second channel profile and the previous second channel profile.

15. The method as claimed in claim 13, wherein:
   the apparatus further comprises a first volatile memory and a second volatile memory,
   the first volatile memory and the second volatile memory store the current first channel profile and the previous first channel profile in response to the sounding transceiver receiving the report packet from the beamformee to respond to the sounding packet,
   the first volatile memory and the second volatile memory store the current second channel profile and the previous second channel profile in response to the sounding transceiver failing to receive the report packet from the beamformee to respond to the sounding packet within the predetermined time period after the sounding packet is transmitted,
   the method further comprises:
   calculating an SINR of the downlink channel according to the channel profiles stored in the first volatile memory and the second volatile memory; and
   mapping the calculated SINR to the first LQ value or the second LQ value according to a prebuilt mapping table.

16. The method as claimed in claim 13, wherein the first volatile memory or the second volatile memory that stores the most outdated first channel profile or second channel profile are overwritten with the current first channel profile or the current second channel profile.

17. The method as claimed in claim 13, further comprising:
    comparing the first sounding interval with the second sounding interval;
    in response to the second sounding interval being shorter than the first sounding interval by a predetermined ratio, controlling the sounding transceiver to transmit another sounding packet to the beamformee immediately; and
    in response to the second sounding interval not being shorter than the first sounding interval by the predetermined ratio, updating the first sounding interval with the second sounding interval.

18. The method as claimed in claim 17, wherein a moving speed of the beamformee is approximately proportional to the first LQ value or the second LQ value.

19. An apparatus, comprising:
    a mobility processor;
    a sounding transceiver, configured to periodically transmit a sounding packet to a beamformee through a downlink channel from the apparatus to the beamformee using a first sounding interval;
    a sounding-control circuit, configured to control the first sounding interval in response to a control signal from the mobility processor; and
    a mobility-calculating circuit;
    wherein in response to the sounding transceiver receiving a data packet or a report packet from the beamformee, the mobility-calculating circuit calculates a first mobility indicator of the beamformee according to a current first channel profile from the received data packet or the received report packet,
    wherein the mobility processor obtains a second sounding interval according to the first mobility indicator and adaptively adjusts the first sounding interval according to the second sounding interval in response to a comparison result of the current first channel profile and a previous first channel profile.

20. The apparatus as claimed in claim 19, wherein the first mobility indicator refers to a first LQ (link quality) value of the beamformee.

* * * * *